Figure 1:
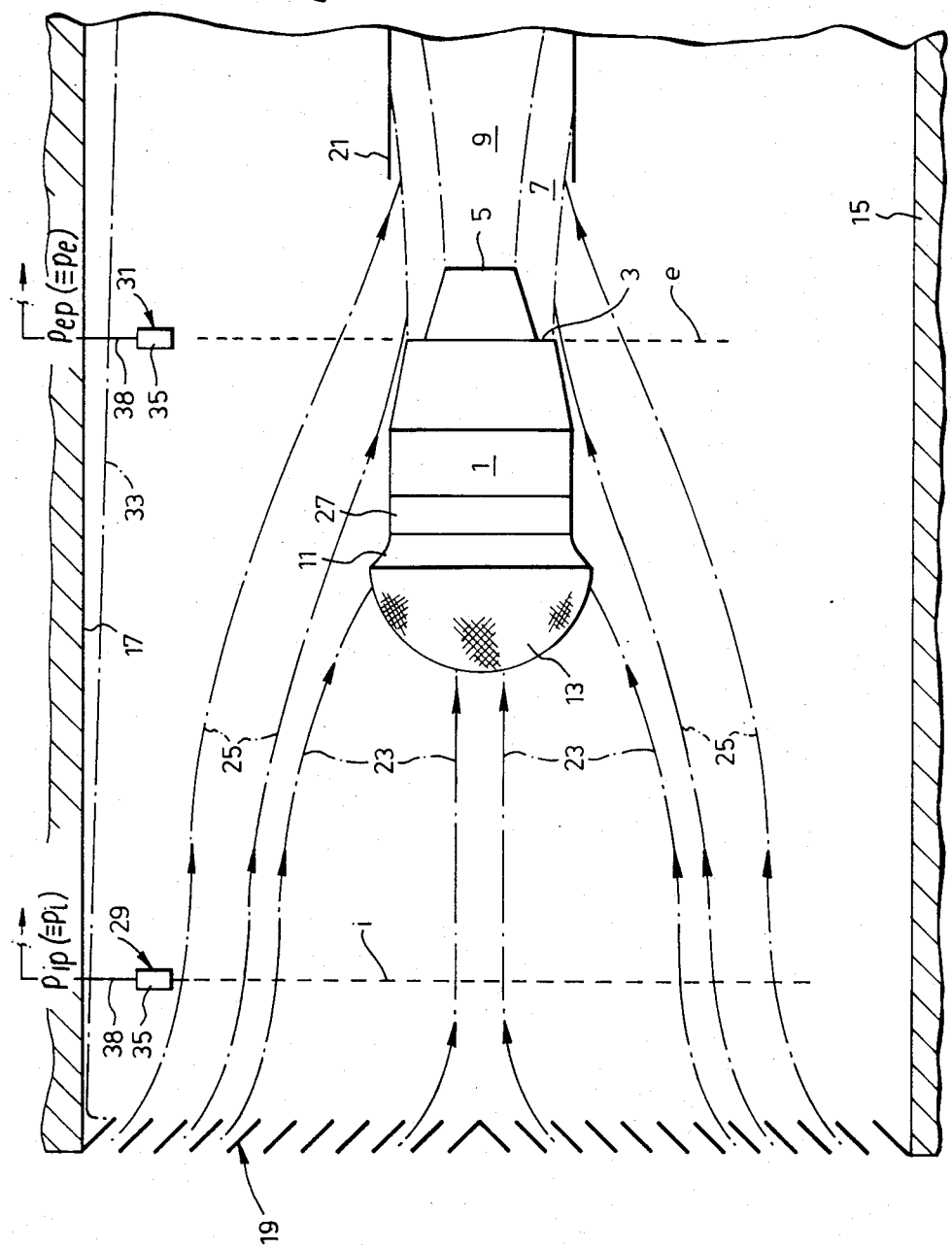

United States Patent [19]

Simpson

[11] Patent Number: 4,537,066

[45] Date of Patent: Aug. 27, 1985

[54] AEROENGINE TEST CELLS

[75] Inventor: Philip A. Simpson, Nottingham, England

[73] Assignee: Rolls-Royce Limited, London, England

[21] Appl. No.: 541,314

[22] Filed: Oct. 12, 1983

[30] Foreign Application Priority Data

Nov. 10, 1982 [GB] United Kingdom ............... 8232151

[51] Int. Cl.³ .......................................... G01M 15/00
[52] U.S. Cl. ................................................ 73/117.4
[58] Field of Search ................... 73/117.4, 117.3, 116, 73/147

[56] References Cited

U.S. PATENT DOCUMENTS 3,837,220 9/1974 McDonald et al. ............... 73/117.4
4,034,604 7/1977 Decher et al. ................. 73/117.4 X Primary Examiner—Jerry W. Myracle
Attorney, Agent, or Firm—Cushman, Darby & Cushman

[57] ABSTRACT

Measurements of net thrust of an aeroengine on a thrust balance in a test cell must be corrected to gross thrust and it is also advantageous to detect changes in the airflows into and through the test cell of a magnitude sufficient to alter significantly the thrust correction factor. The invention can accomplish both these objectives by obtaining measures of the static pressures $p_i$ and $p_e$ in planes i and e respectively of the test cell using pressure probes 29 and 31, and utilizing the measures of $p_i$ and $p_e$ (a) in a function of the form $$D = f(p_i, p_e)$$

where D is the thrust correction necessary to convert the net thrust reading on the thrust balance to gross thrust, and (b) to monitor variations of $p_i$ and $p_e$ with respect to the net thrust and detect such of these variations as are outside predetermined limits of variation, such detection indicating the occurence of changes in the characteristics of the airflows sufficient to alter significantly the value of D.

8 Claims, 3 Drawing Figures

AEROENGINE TEST CELLS

This invention relates to the monitoring of airflows in aeroengine test cells, and to the correction of thrust measurements on thrust balances installed therein.

Aeroengine manufactureres normally guarantee their thrust performance figures for gas turbine aeroengines at levels equivalent to those which would be obtained on an open air test bed, this being the closest practical representation of how the engines would behave when installed on a stationary aircraft. For reasons of convenience or necessity, such as unreliable weather conditions, demonstration of this guaranteed performance is invariably carried out on an indoor test bed, i.e. in a test cell. Aerodynamic factors associated with such indoor testing result in the measured thrust being lower on indoor test beds than on outdoor test beds, necessitating correction up to outdoor level. All engines produced are tested to guarantee their performances before delivery to the customer.

For any particular engine mark, it has been usual to derive the indoor-to-outdoor thrust correction by testing a representative engine on both indoor and outdoor test beds, thereby cross-calibrating the test beds and enabling the derivation of a thrust correction factor which can be applied to correct the indoor test results for all other engines of the same standard. This procedure has the disadvantages that if the aerodynamic characteristics of the indoor test bed are modified, e.g. by changes in or damage to the air intake or exhaust outlet, the cross-calibration must be repeated. Such recalibrations can be subject to long delays due to unsuitable weather; moreover, unnoticed changes in the characteristics of the indoor test bed cannot be allowed for until recalibration is performed for some other reason, thus leading to errors in the thrust measurements.

The present invention provides method and means whereby net thrust measurements can be corrected to gross thrust measurements using simple instrumentation in the test cell, the necessity of cross-calibration between indoor and outdoor test beds is much reduced or eliminated, and changes in the characteristics of indoor test beds which affect the thrust measurements and which might otherwise go unnoticed can be allowed for.

According to the present invention, there is provided a method of correcting net thrust measurements in an aeroengine test cell to cross thrust measurements, the test cell having;

air inlet means for allowing air to enter the test cell to supply an aeroengine when installed for testing therein, exhaust means whereby efflux from the aeroengine plus air entrained into said efflux from within the test cell is exhausted from the test cell, and thrust balance means for measuring the net thrust $X_B$ of the aeroengine in the test cell, said net thrust $X_B$ being the gross thrust X of the aeroengine minus the drag D due to the air-flows into the aeroengine and through the test cell, said drag D being the thrust correction necessary to convert the net thrust reading $X_B$ on the thrust balance to gross thrust X: the method comprising;

obtaining, during testing of the engine, a measure of the static pressure $p_i$ at an "inlet" location i in the test cell, and a measure of the static pressure $p_e$ at an "exit" location e in the test cell, location i being downstream of the air inlet means and upstream of the aeroengine and location e being spaced outwardly from, but in substantial registration with, the downstream end of the test-cell-air-contacting external surface of the engine, and calculating the value of D by utilizing the measures of $p_i$ and $p_e$ in a function of the form $D = f(p_i, p_e)$.

The above function may for example be more specifically expressed as either $$D = A_i \left[ \Delta p_i \frac{(1 + \lambda_e)}{(1 + \lambda_i)} - (2A' - 1) \frac{M_e^2}{K_e^2} \right]$$

or, $$D = A_i \left[ \Delta p_e - \Delta p_i \frac{(\lambda_i - 1)}{(\lambda_i + 1)} - 2 \frac{M_e^2}{K_e^2} (1 - A') \right]$$

where the various symbols are as shown in the accompanying List of Symbols and Definitions and explained in the specific description.

The invention further provides a method of monitoring airflow in the test cell, comprising;

obtaining, during testing of the engine, a measure of the static pressure $p_i$ at an "inlet" location i in the test cell, and a measure of the static pressure $p_e$ at an "exit" location e in the test cell, location i being downstream of the air inlet means and upstream of the aeroengine and location e being spaced outwardly from, but in substantial registration with, the downstream end of the test-cell-air-contacting external surface of the engine, and monitoring variations of said measures of pressures $p_i$ and $P_e$ with respect to $X_B$ and detecting such of said variations as are outside predetermined limits of variation of said measure of $p_i$ and $p_e$ with respect to $X_B$, such detection of variations outside said predetermined limits indicating the occurence of changes in the characteristics of airflow into and through the test cell sufficient to alter significantly the value of said thrust correction.

The invention also provides a thrust measurement correction system and/or an airflow monitoring system for an aeroengine test cell, as well as a test cell incorporating such systems, as described in the accompanying specific description and claims.

Figure 2:
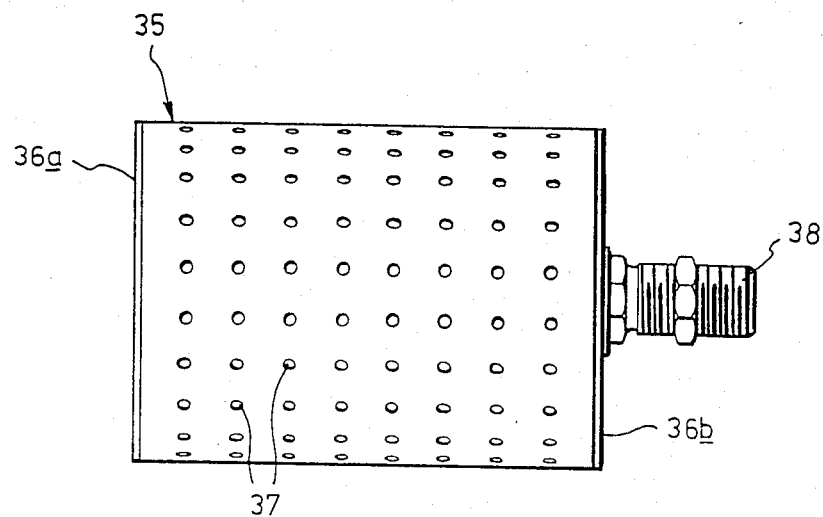
Figure 3:
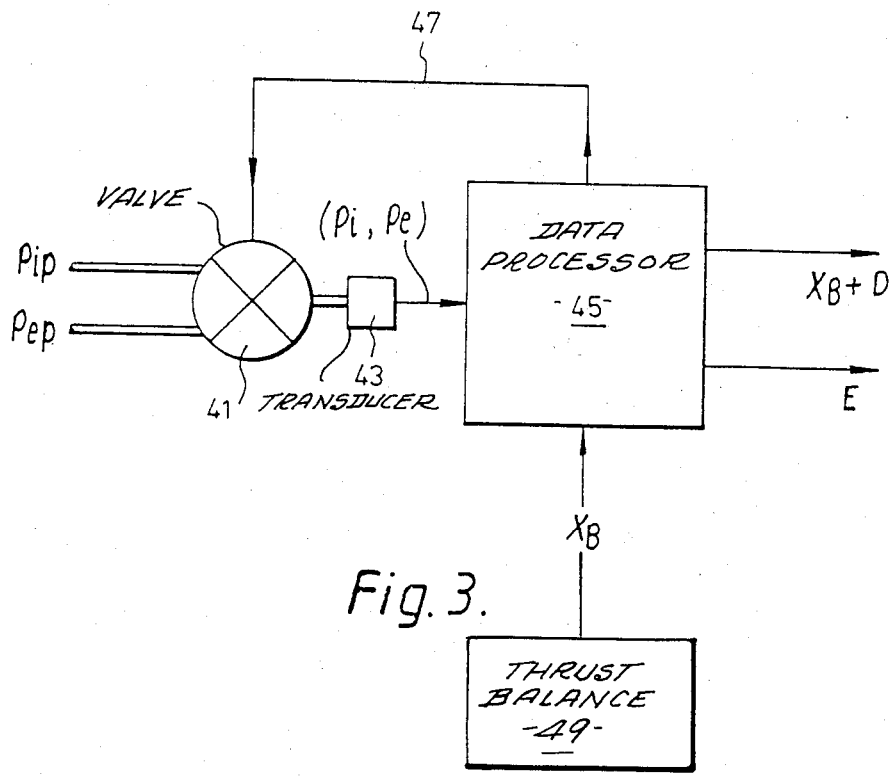

An embodiment of the invention will now be described with reference to the accompanying drawings, in which FIG. 1 is a diagrammatic part-sectional plan view of a test cell with a turbofan aeroengine installed in it;

FIG. 2 is a side elevation of a static pressure probe which may be utilized in performing the invention; and FIG. 3 is a diagram indicating sampling and processing of pressure data to perform the invention.

Referring to FIG. 1, a turbofan aeroengine 1 is of the high by-pass ratio type, having separate coaxial nozzles 3,5 for the bypass and core engine exhaust streams 7,9 respectively. The engine 1 is fitted with an intake flare 11 having a hemispherical wire mesh screen 13 which together act to facilite the smooth ingestion of air into engine and prevent unwanted debris being accidently sucked into it. The engine is supported within the test cell by means of a support frame (called a thrust cradle—not shown) of steel girders which transmits the thrust generated by the twin exhaust streams 7 and 9, less the drag due to the air flow through the test cell, to a thrust balance 49 (FIG. 3) housed within a side wall of the test cell. The thrust cradle and thrust balance are in themselves well known pieces of equipment and need no further explanation.

The test cell itself has the usual solid concrete floor, reinforced concrete roof, reinforced concrete side walls 15 and 17 respectively and reinforced concrete rear walls (not shown). The front of the cell comprises a plurality of rows of noise baffles 19 (only one row of which are shown), through which engine 1 sucks air from the atmosphere. The rear of the cell includes an exhaust collector duct 21 which leads to atmosphere via an exhaust detuner (not shown).

Dashed arrowed lines show some modes of the air flow in the cell. Flow lines 23 are associated with the flow of air into the intake flare 11 of engine 1. The air is energized by the fan (not shown) of engine 1 and a major proportion is passed through the engine's by-pass duct directly to the bypass nozzle 3 for exhaust as annular exhaust stream 7. A minor proportion is passed through compressor, combustor and turbine portions of the core engine and exhausts as products of combustion comprising core engine exhaust stream 9. As it flows into collector duct 21, exhaust stream 7 entrains further air represented by streamlines 25. If the "excess" air 25 were not available for entrainment with the exhaust stream, the engine would tend to produce a low pressure area around the intake flare 11 which would induce recirculation of exhaust gases back to the intake and affect the measured performance of the engine 1.

As is usual in aeroengine test beds, engine 1 is fitted with an airmeter 27, which is merely a short length of parallel-sided ducting which receives air from intake flare 11 and delivers it directly to the fan, the total and static air pressures within the parallel-sided ducting being measured in order to derive the mass-flow of the air into engine 1.

In accordance with the invention, the static pressure of the airflow through the test cell is measured at two locations, namely in an inlet plane i by pressure probe 29 and in an exit plane e by pressure probe 31. Plane i is located sufficiently upstream of the engine to avoid any significant streamline curvature due to the flow of air into the intake flare 11, and sufficiently downstream of baffles 19 to allow the worst of the non-uniform flow conditions generated by the passage of the air flow through the baffles to subside. Plane e is located at or just upstream of the exit plane of bypass nozzle 3 in order to take account of substantially all the drag losses due to flow of entrained air 25 over the outer casing of the engine 1.

Pressure probes 29 and 31 both project rigidly from the wall 17 of the test cell at right angles with respect to the vertical plane through the centreline of the engine 1 and sense the static pressure of the airflow beyond the influence of the boundary layer 33 which adheres to the wall with increasing thickness towards the rear of the cell. Probes 29 and 31 could alternatively project from the other wall of the test cell, the ceiling, or even the floor if this were convenient, but should be aligned with the centerline of the engine.

The pressure probes 29 and 31 are colloquially known as "pepperpots" and each comprise a hollow cylindrical "can" 35 (FIG. 2) whose circular ends 36a, 36b, are merely discs of sheet metal but whose cylindrical sheet metal flanks are provided with a large number of perforations 37 evenly distributed around their circumferential and longitudinal extent. The internal volume of each can 35 communicates with a pipe 38 leading to a pressure transducer (not shown) for measuring the static pressure in the can. The static pressure in the cans 35 is very close to the true static pressure of the air flow external to the probe, except that it is subject to unwanted fluctuations. To overcome the effect of these fluctuations of the pressure within the cans 35, the pipes 37 each include a restrictor (e.g. about a meter of 0.75 mm internal diameter hypodermic pipe) and a reservoir (e.g. about 900 cm$^3$ capacity) in order to present the pressure transducers with a time averaged value of the pressure. The time over which averaging occurs must of course be long enough to reduce the effects of pressure fluctuations to insignificant proportions, short enough to ensure that engine tests are conducted expeditiously, and consistent with the time over which engine balance thrust is being averaged.

In FIG. 1, the static pressure $p_i$ in plane i as measured by pepperpot probe 29 is labelled $p_{ip}$ and the static pressure $p_e$ in plane e as measured by pepperpot probe 31 is labelled $p_{ep}$.

As mentioned before, when the engine is being tested in the test cell, its thrust as measured on the thrust balance is different from the true thrust which would be obtained if the engine were being tested out-of-doors. This is because of drag effects due to the flow of air through the test cell acting in opposition to the thrust of the engine. Thus, if $X_B$ is the thrust measured on the thrust balance in the test cell, X is the true (outdoor) thrust and D is the drag due to the airflow through the test cell, then $$X_B = X - D \tag{1}$$

D includes the drag due to the ram effect as the air 23 flows into the intake fittings 11, 13 and 27 of the engine 1, the drag due to the entrainment air 25 flowing over the external casings of the engine, the intake fittings, and the thrust cradle structure which supports the engine 1 from the thrust balance, and the drag due to the pressure difference between planes i and e. D also includes a parasitic drag element due to shear in the cell wall boundary layer and air flow around objects in the test cell other than the engine and thrust cradle. These parasitic drags should ideally be accounted for to produce a true correction. However, we have found that in practice these parasitic drags are only a small fraction of a percentage of the thrust of a large turbofan engine and so can be neglected.

In order to utilise the static pressures as measured by "pepperpot" probes 29 and 31 to derive the value of the indoor-to-outdoor thrust correction, D, for the chosen test cell, it is necessary to establish the mathematical relationship between D and the static pressures in planes i and e. This relationship can be expressed as $$D = f(p_i p_e) \tag{2}$$

and, within allowable limits of accuracy, $p_i = p_{ip}$ and $p_e = p_{ep}$.

This can be accomplished by the following procedure:

Step 1 Perform a pitot-static pressure survey of test cell airflow in planes i and e during testing of one particular engine at selected engine thrust values which are representative of the range of thrusts to be guaranteed.

Step 2 For each selected thrust value, utilize the results of the pitot-static pressure survey to establish an accurate momentum balance of the test cell airflows through planes i and e.

Step 3 Derive a momentum balance equation specific to the test cell.

Step 4 Derive values of D for each selected thrust value using the momentum balances already established in steps 2 and 3 and cross-check the values of D thus derived by testing the engine at an outdoor test site at the selected thrust values and noting the differences between the indoor and outdoor thrust balance measurements. This is an optional step to establish confidence that the values of D over the thrust range of interest can be derived accurately from air flow measurements in the particular cell which has been chosen.

Step 5 Using the momentum balance equation from Step 2, derive an expression which gives D in terms of $p_i$ and $p_e$ only (i.e. Equation 2). This expression can be used to give thrust corrections for other engines of the same standard when tested in the same or a similar test cell.

Some details of Steps 1 to 5 will now be elaborated with reference to an example of the setting up of a system according to the invention in an actual test cell. FIG. 1 will again be taken to represent the layout of the test cell.

EXAMPLE (a) Pitot-static pressure survey of airflow in planes i and e

The precise positioning of plane i was dictated by the conflicting requirements of being far enough upstream of the intake flare 11 to avoid curvature of streamlines 23, and far enough downstream of the baffles 19 to avoid their wakes. Since the effect on pressure measurements due to streamline curvature can be estimated or measured and accounted for, the latter requirement was taken as the overiding one.

The precise positioning of plane e was dictated by the need to take account of the total drag due to the flow of entrained air 25 over the outer surface of engine 1.

Ideally, a detailed survey of pitot-static pressures should be undertaken in both planes in order to establish the momentum of the airflow in both planes for the various engine thrusts, but this was not possible for plane e, since the test cell at this location was liable to be aerodynamically cluttered and the airflow subject to distrubence. This problem was overcome as detailed later.

The pitot-static pressure survey was carried out with reference to a fixed matrix of measurement positions in each of planes i and e, the same sets of measurements being taken for each selected value of engine thrust. Pressures $p_{ip}$ and $p_{ep}$ were also measured at each thrust setting in the pitot-static survey. This allowed the mathematical relationship between pressures $p_{ip}$ and $p_{ep}$ to be established (e.g. by plotting a graph), this being necessary to aid in the derivation of the test cell momentum balance equation as detailed later. Additionally, pressure $p_{ip}$ was used as a reference static pressure for the survey measurements as detailed later and was therefore sampled every time a survey measurement position was sampled. The pitot-static pressure measuring system was suitably damped to the same extent as the pepperpot probes 29 and 31 in order to smooth out pressures fluctuations due to high frequency turbulence in the air flow. The assumption could then be made that changes in the pressure measurements were caused only the the low frequency changes in speed and thrust of the engine, provided that fluctuations caused by crosswinds affecting the test cell air inlet or detuner exit were eliminated by testing in relatively calm conditions.

In order to cover the matrix of measurement positions quickly, a number of pitot-static probes were mounted on a horizontally positioned boom and the boom then transversed up and down in the relevant plane. Only one pressure transducer was used, the pressure tappings from the probes being led to an electrically scanned valve which fed the tranducer with the pressures from each probe in turn. The task may be further simplified if the cell air flow is symmetrical about the vertical median plane of the cell, which is of course coincident with the centerline of the engine; the traverse measurements need then only to be on one side of the cell.

A suitable test procedure for the pitot-static pressure survey was as follows:

(i) Position the traverse equipment at a selected vertical station.

(ii) Calibrate the measuring system with a known pressure datum (such as a dead weight) and zero pressure.

(iii) Accelerate the engine slowly to one of the selected thrust settings.

(iv) Allow the engine and the test cell airflows to stabilise (four minutes was allowed in these tests) and take the pitot-static measurements plus any other measurements required, such as airmeter measurements and static pressure measurements $p_{ip}$ and $p_{ep}$.

(v) Repeat (iii) and (iv) for the other selected thrust settings.

(vi) Repeat all the above for all positions of the traverse equipment.

The pitot (total) and static pressure measurements during the survey were absolute, whereas measurements of the differences from ambient (atmospheric) pressure were required. Each survey pressure measurement was therefore subtracted from the value of ambient pressure measured at the same time to give a relative pressure $\Delta p$ (static) or $\Delta P$ (total), i.e.

$$\Delta p = p_o - p \qquad (3)$$

and $$\Delta P = p_o - P \qquad (4)$$

where
  $p_o$ is the ambient pressure,
  p is the survey static pressure measurement and
  P is the survey total pressure measurement.

The survey pressure measurements were made at engine running conditions which are nominally steady, but which in reality inevitably vary slightly. Therefore each survey pressure measurement was "normalized" by factoring it with a reference pressure.

In using this system of normalizing pitot (total) and static pressure values measured in the survey by factoring them with a reference pressure, it was assumed that the relationship between the changes in cell pressure and the changes in the engine running conditions which caused the pressure changes, was the same at all points in a particular cross-section of the bed, and did not change with time. This assumption has the corollaries that all the static pressures measured in the bed can be assumed to be proportional to each other and that the relationship between thrust and test cell pressure is a simple one involving only changes in engine flow and entrained flow.

Each static pressure measurement from a pitot-static probe was normalized by multiplying it by the ratio of the datum value of the reference static pressure to the value of the reference static pressure measured along with the survey pressure, the survey and reference pressures first being converted to relative pressures as in equation (3) above. Thus, $$(\Delta p)_{normalized} = \Delta p \cdot \frac{(\Delta p_r)_{datum}}{\Delta p_r} \quad (5)$$

where $p_r$ is the reference static pressure, identified with $p_{ip}$ in the present Example, as mentioned above, and $(P_r)_{datum}$ is the mean of all the reference values measured at a particular thrust level by the probe 29 during the survey.

Survey total pressure measurements were also normalized by relating them to the reference static pressure measurements. However, the flow into and through the test cell is subject to total pressure losses, and these losses vary according to the location in the cell. To take these losses into account, a local pressure loss coefficient, $\lambda$, can be defined for any location in the test cell, i.e.

$$\lambda = (p_o - P)/(P - p)$$

Using equations (3) and (4) above, this gives $$\lambda = \Delta P/(\Delta p - \Delta P)$$

or $$\Delta P(1 + \lambda) = \lambda \Delta p$$

hence $$\Delta P = \Delta p \cdot \lambda/(1 + \lambda) \quad (6)$$

It follows that $$(\Delta P)_{normalized} = (\Delta p)_{normalised} \cdot \lambda/(1 + \lambda)$$

Substituting from equations (5) and (6), $$(\Delta P)_{normalized} = \Delta P \cdot \frac{(\Delta p_r)_{datum}}{\Delta p_r} \quad (7)$$

(b) Momentum balance of the test cell airflows through planes i and e

Once the pitot-static survey of the cell air flow in planes i and e was completed, the normalised total and static pressure measurements were used to obtain a momentum parameter (see below) for the air flow at all measurement points in the survey. In fact, it was realised that a reliable pitot-static survey of all points in plane e was not possible as mentioned earlier and therefore the momentum parameter was derived for each individual measurement point in plane i only; in plane e, the momentum of the entire airflow was derived from flow continuity and the measurements of $p_{ep}$ by pepperpot probe 31 during the survey in plane i.

As is well known, the total impulse or momentum I of an air stream moving at Mach No. $M_N$ through a plane of area A with a static pressure p is given by $$I = Ap(1 + \gamma M_N^2) \quad (8)$$

where $\gamma$ is the ratio of the specific heats of the air at constant volume and constant pressure. The impulse per unit area ($I_o$) is thus given by $$I_o = p(1 + \gamma M_N^2) \quad (9)$$

As is well known, $$M_N^2 = \frac{2}{\gamma - 1}(T/t - 1)$$

where T is the total temperature of the air at the measuring point, t is the static temperature of the air at the measuring point, and $$T/t = (P/p)^{(\gamma - 1)/\gamma} \quad (10)$$

Therefore, $M_N^2 = \frac{2}{\gamma - 1}[(P/p)^{(\gamma - 1)/\gamma} - 1] \quad (11)$ from which it will be seen that equation (11) can be substituted into equation (9) to give $I_o$ in terms of the absolute total static pressures, assuming $\gamma = 1.4$. Using the normalized pressure measurements, P/p was replaced by $$\frac{p_o - (\Delta P)_{normalized}}{p_o - (\Delta p)_{normalized}},$$

and $I_o$ was evaluated for each survey measurement point in plane i.

In order to calculate the total momentum $I_i$ of the airflow through plane i at each selected engine thrust, the characteristics of the airflow at each measurement point were taken to be representative of the characteristics of an element of the airstream flowing through an "area of influence" allocated to the measurement point and surrounding it, the sides of each area of influence being contiguous with the sides of neighboring areas of influence in the manner of honeycomb or similar network. The momentum of the airstream element through each area of influence was thus computed by multiplying $I_o$ by the area of the area of influence, and the total momentum $I_i$ of the airstream through plane i was obtained by summing the momenta of all the airstream elements.

Note that in the case mentioned earlier, where it could be considered allowable to take pitot-static traverse measurements on only one side of the cell, the traverse data for each airstream element would be treated as if it not only represented its own area of influence but also represented a mirror image position on the opposite side of the cell.

As mentioned previously, plane e was found to be aerodynamically cluttered, so that the pitot-static survey data for plane e could not be considered reliable. However, this problem was overcome by firstly establishing the massflow of the entrained air 25 through plane e by simply subtracting the massflow of air 23 going through the engine (as measured by airmeter 27) from the total mass flow of air 23 and air 25 as calculated from the pitot-static survey of plane i. Secondly, the static pressure $p_{ep}$ measured by probe 31 at each thrust setting was used in conjunction with the mass-flow data to obtain a mean value of the total pressure $P_e$ of the airflow at plane e, and from this the total momentum $I_e$, of the entrained air 25 through plane e could be calculated by applying equations (11) and (8).

An accurate experimentally derived momentum balance between planes i and e could then be established for each thrust level, this being the change in momentum $I_i - I_e$, which is the thrust correction, D.

(c) Derivation of Momentum Balance Equation Specific to Test Cell

The total impulse or momentum I of an incompressible airflow with total massflow M, velocity V, cross-sectional area A and static pressure p is given by $$I = MV + Ap.$$

If the density of the air is $\rho$, then $$I = \rho A V^2 + Ap \tag{12}$$

Also, again for incompressible flow, $$P/\rho = p/\rho + V^2/2, \text{ i.e. } V^2 = 2(P-p)/\rho \tag{13}$$

Substituting (13) in (12), $$I = 2A(P-p) + Ap = A(2P - 2p + p)$$

Now, if $p_o - P = \Delta P$ and $p_o - p = \Delta p$, where $p_o$ is ambient pressure, then $$I = A(p_o + \Delta p - 2\Delta P) \text{ or,}$$

$$1 - I/Ap_o = 2\Delta P/p_o - \Delta p/p_o \tag{14}$$

It is conventional to assume that air-flows are incompressible provided that their velocities do not exceed about 60 meters/second. Since the air flows in the test cell remained below this value, equation (14) could be applied to the pitot-static survey data. Therefore, for inlet plane i, $I = I_i$, the total momentum (impulse) of the airstream through plane i
$A = A_i$, the area of plane i,
$P = P_i$, the mean total pressure of the airflow in plane i, and
$p = p_i$, the inlet plane static pressure;
so that equation (14) can be re-written as $$1 - I_i/A_ip_o = 2\Delta P_i/p_o - \Delta p_i/p_o \tag{15}$$

where $$\Delta P_i = p_o - P_i, \text{ and}$$

$$\Delta p_i = p_o - p_i$$

It was recognised that there were losses in the airflow due to passage through the test cell intake 19. These were taken into account by defining an intake loss coefficient $\lambda_i$, where $$\lambda_i = (p_o - P_i)/(P_i - p_i) = \Delta P_i/(\Delta p_i - \Delta P_i), \text{ or}$$

$$\Delta P_i = \Delta p_i \lambda_i /(1 + \lambda_i) \tag{16}$$

Substituting for $\Delta P_i$ in equation (15), we get $$1 - I_i/A_ip_o = \frac{\Delta p_i}{p_o} [2\lambda_i/(1 + \lambda_i) - 1] \tag{17}$$

and $\lambda_i$ could be evaluated from the pitot-static survey data. We found that one value of $\lambda_i$ satisfied equation (17) over the whole test operating range of the engine.

The next stage in deriving a momentum balance equation specific to the test cell was to derive an expression giving the total mass-flow $M_i$ of air through plane i in terms of the inlet plane i static pressure $p_i$. Incompressibly, $$M_i = \text{constant} \times \sqrt{P_i - p_i}$$

If the constant $= K_i$ and is taken to include any relationships between $P_i$ and $p_i$ and the mean values of $P_i$ and $p_i$ required to give $M_i$, then $$M_i = K_i \sqrt{P_i - p_i} = K_i \sqrt{\Delta p_i - \Delta P_i} \tag{18}$$

This can be re-written using equation (16) as $$M_i = K_i \sqrt{\Delta p_i - \Delta p_i \lambda_i/(1 + \lambda_i)} \tag{19}$$

$$= K_i \sqrt{\Delta p_i/(1 + \lambda_i)}$$

Thus, when $\lambda_i$ had been evaluated using equation (17) and the survey results, $K_i$ could also be evaluated from the survey results for $M_i$ and $p_{ip}$. We found that one value of $K_i$ satisfied equation (19) over the whole test operating range of the engine.

It was now necessary to derive an expression giving the total entrained mass-flow $M_e$ of air through plane e in terms of the inlet plane static pressure $p_i$. Once again, $$M_e = \text{constant} \times \sqrt{P_e - p_e}$$

If constant $= K_e$ and is taken to include any relationships between $P_e$ and $p_e$ and their mean values required to give $M_e$, then $$M_e = K_e \sqrt{P_e - p_e} = K_e \sqrt{\Delta p_e - \Delta P_e} \tag{20}$$

Again, internal losses in the entrained airflow as it left the inlet plane i and passed to plane e were taken into account by defining an internal loss coefficient, $\lambda_e$, where $$\lambda_e = (P_i - P_e)/(P_i - p_i) = (\Delta P_e - \Delta P_i)/(\Delta p_i - \Delta P_i)$$

Utilising equation (16), we get $$\lambda_e = \frac{\Delta P_e - \Delta p_i \lambda_i/(1 + \lambda_i)}{\Delta p_i - \Delta p_i \lambda_i/(1 + \lambda_i)}, \text{ which simplifies to} \tag{21}$$

$$\lambda_e = \frac{\Delta P_e}{\Delta p_i}(1 + \lambda_i) - \lambda_i$$

The value of $\lambda_e$ could thus be determined from survey data relating to $P_e$ and $p_{ip}$, $\lambda_i$ already being known. From equation (21), $$\Delta P_e = \Delta p_i(\lambda_e + \lambda_i)/(1 + \lambda_i) \qquad$$

Therefore, equation (20) can be re-written as $$M_e = K_e[\Delta p_e - \Delta p_i(\lambda_e + \lambda_i)/(1 + \lambda_i)]^{\frac{1}{2}} \qquad (22)$$

The value of $K_e$ could thus be derived from the survey data, $\lambda_e$ and $\lambda_i$ already having been calculated.

The momentum $I_{e'}$, of the entrained flow was calculated from the survey data, as already detailed, and also as follows: Let $I_e$ = total momentum in plane e. Considered incompressibly, $$I_e = A_i p_e + M_e V_e + M_J V_J$$

where $M_J$ is the combined massflow of the propulsive jets (bypass flow plus turbine exhaust flow), and
$V_J$ is the notional mean velocity of the propulsive jets so that $M_J V_J$ is the gross thrust of the propulsive jets. Hence, incompressibly, $$I_{e'} = A_i p_e + M_e V_e \qquad (23)$$

and by analogy with equation (8), $$I_{e'} = A_i p_e + \gamma M_{Ne}^2 A_e p_e$$
$$= A_i p_e + \gamma M_{Ne}^2 p_e (A_i - A_J)$$

where $A_J$ is the combined cross-sectional area of the propulsive jets.

Thus,
$$I_{e'} = p_e[(1 + \gamma M_{Ne}^2)A_i - \gamma M_{Ne}^2 \cdot A_J] \qquad (24)$$

Also, utilising equation (23) and equation (13)

$$I_{e'} = A_i p_e + \rho A_e V_e^2$$
$$= A_i p_e + 2(P_e - p_e)A_e$$
$$= A_i p_e + 2(P_e - p_e)(A_i - A_j)$$

Dividing through by $A_i$, $$I_{e'}/A_i = p_e + 2(P_e - p_e)(A_i - A_j)/A_i$$

From equations (3) and (4), $$P_e - p_e = \Delta p_e - \Delta P_e, \text{ and}$$
$$p_e = p_o - \Delta p_e$$

Therefore, $$I_{e'}/A_i = p_o - \Delta p_e + 2(\Delta p_e - \Delta P_e)(A_i - A_j)/A_i$$
$$= p_o - 2\Delta P_e(A_i - A_j)/A_i + \Delta p_e[2(A_i - A_j)/A_i - 1]$$

Let $(A_i - A_j)/A_i = A'$, then divide through by $p_o$ and rearrange to give, $$1 - I_{e'}/A_i p_o = 2A'\Delta P_e/p_o - (2A' - 1)\Delta p_e/p_o \qquad (25)$$

From equations (25) and (21), $$1 - I_{e'}/A_i p_o = 2A'\frac{\Delta p_i}{p_o}\left(\frac{\lambda_e + \lambda_i}{1 + \lambda_i}\right) - \frac{\Delta p_e}{p_o}(2A' - 1) \qquad (26)$$

Since, for the test cell under consideration, the mathematical relationship between values of $p_{ip}$ and $p_{ep}$ had already been established during the pitot-static survey, equation (26) could then be used to derive values of the entrained flow momentum for comparison with that already calculated from the survey data, thereby giving confidence that the steps in the derivation of a momentum balance equation for the test cell were valid.

Equation (26) can also be written in terms of $M_e$, the total entrained mass-flow of air through plane e, using equation (22), i.e.

$$1 - \frac{I_{e'}}{A_i p_o} = 2A'\frac{\Delta p_i(\lambda_e + \lambda_i)}{p_o(1 + \lambda_i)} - \qquad (27)$$

$$\left[\left(\frac{M_e}{K_e}\right)^2 + \frac{\Delta p_i(\lambda_e + \lambda_i)}{1 + \lambda_i}\right]\left(\frac{2A'}{p_o} - \frac{1}{p_o}\right)$$

$$= \frac{\Delta p_i(\lambda_e + \lambda_i)}{p_o(1 + \lambda_i)} - \frac{M_e^2}{p_o K_e^2}(2A' - 1)$$

The final step in derivation of the momentum balance equation can now be taken. From equation (1), $$D = X - X_B$$

Now,
$$X = I_e - I_{e'}$$

and
$$X_B = I_e - I_i$$

therefore
$$D = I_i - I_{e'} \qquad (28)$$

which is the change in momentum from plane i to plane e. Rearranging equation (28) in a form convenient for utilizing equations (27) and (17)

$$D = A_i p_o[(1 - I_{e'}/A_i p_o) - (1 - I_i/A_i p_o)] \qquad (29)$$

$$= A_i p_o\left[\frac{\Delta p_i(\lambda_e + \lambda_i)}{p_o(1 + \lambda_i)} - \frac{M_e^2}{p_o K_e^2}(2A' - 1) - \right.$$

$$\left. \frac{\Delta p_i}{p_o}\left(\frac{2\lambda_i}{1 + \lambda_i} - 1\right)\right]$$

$$= A_i[\Delta p_i(1 + \lambda_e)/(1 + \lambda_i) - (2A' - 1)M_e^2/K_e^2]$$

which is the desired momentum balance equation.

(d) Derivation of D for each Selected Thrust Value and Cross-Checking with Survey and Thrust Balance Measurements Equation (29) was utilised to calculate D for the selected thrust values, $M_e$ being available from equation (22) using the established relationship between values of $p_{ip}$ and $p_{ep}$. The values of D thus obtained were compared with momentum-change values between planes i and e, obtained from the pitot-static survey data as detailed under (b) above, and with the differences between actual indoor and outdoor thrust balance measurements as mentioned in Step 4 above. It was found that values of D obtained by all three methods agreed within acceptable limits.

(e) Derivation of Equation giving D in terms of $p_i$ and $p_o$ only

Superficially, evaluation of D in equation (29) requires knowledge only of $\Delta p_i$ and does not require $\Delta p_e$, which has been replaced by $\lambda_e$ and $M_e$. However, the term $\lambda_e$ may not be a true constant if, for example, a change in the exhaust detuner (not shown in FIG. 1, but connected to the exhaust collector duct 21) causes a change in $M_e$, since in that case $M_e/M_i$ would change and so would the degree of expansion in area of $M_e$ from plane i to plane e, which is one of the factors influencing the value of $\lambda_e$. This shows the desireability of re-writing equation (29) to omit $\lambda_e$, and if equation (22) is utilised to do this, we find that we can obtain an expression in the form of equation (2). Thus, rearranging equation (22), $$\lambda_e = (+\lambda_i)(\Delta p_e - M_e^2/K_e^2)/\Delta p_i - \lambda_i$$

and substituting into equation (29) and simplifying, we obtain $$D = A_i[\Delta p_e - \Delta p_i(\lambda_i - 1)/(\lambda_i + 1) - 2(1 - A')M_e^2/K_e^2] \quad (30)$$

The Example shows that the thrust correction, D, can be expressed by either equation (30) or equation (29), $M_e$ being obtained by evaluating $M_i$ from equation (19) and the knowledge that $M_e$ is the difference between $M_i$ and the mass flow of air into the intake of the engine as measured by the airmeter 27. Equation (30), however, enables the value of the indoor-to-outdoor thrust correction, D, to be derived from a knowledge of only the static pressures $p_{ip}$ and $p_{ep}$ measured by "pepperpot" probes 29 and 31, and thus makes possible direct monitoring of the thrust corrections required during the indoor testing of all engines of the same type, once the test cell being utilized has been surveyed and calibrated as described above. The amount of open-air testing necessary for cross-calibrating between indoor and outdoor test beds is thus minimized, and the accuracy of the thrust measurements are increased compared with open air testing because the latter is subject to larger fluctuations in measured thrust due to wind effects.

Monitoring of the static pressures in the test cell in planes i and e provides a further benefit, stemming from the fact that $p_{ip}$ and $p_{ep}$ depend not only upon the thrust being generated by the engine under test, but also upon the condition of the test cell air inlet system, the exhaust detuner, and the degree of obstruction to the airflow through the test cell.

Thus, for plane i, equation (19) shows that changes in $p_i$ at a fixed level of gross thrust can only be caused by changes in $M_i$ or $\lambda_i$, which mirror flow characteristics of the test bed air inlet system. However, it can be safely assumed that any unnoticed changes in the test bed airflow characteristics will not significantly alter the mass flow of the air into the engine for a given gross-thrust level and therefore any changes in $M_i$, the mass-flow of air through inlet plane i, at a given gross thrust X, can only be caused by a change of $M_e$, the total mass-flow through plane e. It is therefore possible to say that changes in $p_i$ indicate changes in $M_e$ and $\lambda_i$.

Similarly, for exit plane e, equation (22) can be used to show that at a given value of $\Delta p_i$ ($M_e$ and $\lambda_i$ being monitored by observation of $p_{ip}$ to ensure their substantial non-variation) the difference between the two pressures $p_i$ and $p_e$ is only affected by changes in $\lambda_e$. Thus, from equation (22), $$\Delta p_e = M_e^2/K_e^2 + \Delta p_i(\lambda_e + \lambda_i)/(+\lambda_i)$$

By equation (3) and the above equation, $$\begin{aligned} p_e - p_i &= \Delta p_i - \Delta p_e \\ &= \Delta p_i - M_e^2/K_e^2 - \Delta p_i(\lambda_e + \lambda_i)/(1 + \lambda_i) \\ &= \Delta p_i(1 - \lambda_e)/(1 + \lambda_i) - M_e^2/K_e^2 \end{aligned} \quad (31)$$

From the above considerations it is evident that monitoring of pressures $p_{ip}$ and $p_{ep}$ from probes 29 and 31 provides checks on variations in $M_e$, $\lambda_i$ and $\lambda_e$. Normally, for a given thrust level, these characteristics of the test cell will not change, so that $p_{ip}$ and $p_{ep}$ will not vary outside certain limits with respect to $X_B$, the measured thrust of the engine, and the thrust correction D derived from equation (30) will be valid. However, if the air intake or exhaust detuner are damaged or become partially blocked, or if the test cell becomes unduly cluttered with extra equipment, $\lambda_i$, $\lambda_e$ or $M_e$ will change and $p_{ip}$ or $p_{ep}$ will be affected and will move outside their expected limits with respect to $X_B$ thus giving warning that the thrust correction has become invalid and that the test cell must be restored to its original condition or else recalibrated. Thus, given that $p_i$ and $p_e$ (measured as $p_{ip}$ and $p_{ep}$ respectively) should be known functions of $X_B$ within the expected limits $\pm y_1$ and $\pm y_2$ respectively, i.e.

$$p_i = f_1(X_B) \pm (0 \rightarrow y_1) \quad (32)$$

or, $$p_e = f_2(X_B) \pm (0 \rightarrow y_2) \quad (33)$$

then either of the conditions $$p_i \neq f_1(X_B) \pm (0 \rightarrow i\ y, ) \text{ or } p_e \neq f_2(X_B) \pm (0 \rightarrow y_2)$$

indicates an invalid thrust correction.

For assurance that the normal (day-to-day) variations in $p_{ip}$ and $p_{ep}$ with respect to $X_B$ have been adequately quantified, it is advisable to install a pilot system in a test cell and observe those variations for a statistically significant period of time.

In the above example and comments, emphasis has been laid upon the desireability of utilizing the invention to derive an accurate thrust correction figure during testing of aeroengines, warning being given of any serious reduction in accuracy of the thrust correction by means of monitoring the individual relationships between the measured thrust $X_B$ and the pressures $p_{ip}$ and $p_{ep}$. However, even in the absence of any requirement or desire to derive an accurate thrust correction other than by the known technique of cross-calibration of outdoor and indoor test beds, the monitoring of the relationship between pressures $p_{ip}$ and $p_{ep}$ and the thrust $X_B$ measured on the thrust balance would still provide warning of undesirable changes in the test cell characteristics and consequential invalidity of the thrust corrections derived from the indoor-to-outdoor cross-calibration.

Although the invention has been described with reference to the testing of a turbofan aero-engine having separate exhaust nozzles for its bypass and core engine exhaust streams, it is also applicable to turbofans having an exhaust nozzle common to both streams, or to turbojets. In the latter two cases the plane e would of course be coincident with, or just forward of, the exit plane of the exhaust nozzle. Further, the exhaust nozzle may be of the convoluted noise suppressing type, or similar.

The invention would also be applicable to the testing of turboprop or prop-fan aeroengines, plane i being of course appropriately situated between the test cell air inlet and the propellor or prop-fan, and plane e being situated in registration with the rear of the "air-washed" external surface of the engine under test.

In connection with the determination of the positioning of plane e for any particular type of engine, it is emphasised that it is only the "air-washed" external surface of an aeroengine under test which contributes to the drag D, i.e. that exposed external surface which during testing is contacted by the air-flows through the test cell. Thus, in FIG. 1, the conical surface of core engine exhaust nozzle 5, which projects beyond the bypass exhaust nozzle 3, does not contribute to drag D, being shielded from contact with test cell air-flows 25 by the bypass exhaust stream 7.

It will be apparent to those skilled in the art that the measurements necessary for setting up a system according to the invention can be conveniently controlled and processed by computer, the computer receiving data inputs from the pitot-static survey and the other measurements and being programmed to solve the relevant equations mentioned above. Likewise, when the system is operational, the values of $p_{ip}$ and $p_{ep}$ during engine testing can be fed to a computer programmed to calculate the required thrust correction and/or to give an error indication if the values of $P_{ip}$ and $p_{ep}$ go outside certain limits with respect to measured thrust $X_B$. In FIG. 3, pressures $p_{ip}$ and $p_{ep}$ are fed through an electronically controlled valve 41 to a transducer 43 whose output signal is digitised and read by data processor 45. The latter is programmed to control valve 41 via control link 47 so as to sample values of $p_{ip}$ and $p_{ep}$ at certain values of thrust $X_B$ from thrust balance 49 and calculate the thrust correction $D = f(p_i, p_e)$ at those values of $X_B$, the correct gross thrust $X_B + D$ being outputted. Data processor 45 also looks for the conditions $$p_i \neq f_1(X_B) \pm (0 \to y_1) \text{ or, } p_e \neq f_2(X_B) \pm (0 \to y_2)$$

and if either of these conditions are met, an error alert output E is produced.

There follows a summary listing of the symbols, definitions and formulae appearing above:

LIST OF SYMBOLS AND DEFINITIONS

Subscripts:
- i—flow condition at inlet plane location of test cell
- e—flow condition at exit plane location of test cell
- e'—entrained flow condition at exit plane of test cell
- p—measurement by "pepperpot" pressure probe Others:
- A—cross-sectional area of airstream
- $A_J$—cross-sectional area of propulsive jets (bypass+core)
- $A^1$—$(A_i - A_J)/A_i$
- D—drag forces due to air flow through test call
- I—total impulse of airstream
- $I_O$—impulse of airstream per unit area
- K—incompressible airstream massflow constant $= M/\sqrt{\Delta p - \Delta P}$
- M—massflow of airstream
- $M_J$—massflow of propulsive jets (bypass+core)
- $M_N$—Mach number $= \sqrt{2(T/t - 1)/(\gamma - 1)}$
- P—total pressure
- P—static pressure
- $P_o$—ambient (atmospheric) pressure
- $P_r$—reference static pressure
- $(P_r)$datum—datum value of reference static pressure $$\Delta P = P_o - P$$

$$\Delta p = P_o - P$$

$$\Delta P_r = P_o - P_r$$

($\Delta p$) normalised $= \Delta p \cdot (\Delta p_r)$ datum/$\Delta p_r$

- T—total temperature
- t—static temperature
- V—mean velocity of airstream
- $V_J$—mean velocity of propulsive jets (bypass and core)
- X—true (i.e. gross) thrust of engine
- $X_B$—thrust of engine as measured on thrust balance in test cell
- $\overline{Y}_1$—expected limit of variation of $p_i$ with respect to $X_B$
- $\overline{Y}_2$—expected limit of variation of $P_e$ with respect to $X_B$
- $\gamma$—ratio of specific heats of air at constant volume and pressure
- $\lambda$—local pressure loss coefficient $= (P_o - P)/(P - p)$
- $\rho$—density of airstream

LIST OF FORMULAE $$X_B = X - D \tag{1}$$

$$D = f(p_i, p_e) \tag{2}$$

$$\Delta p = p_o - p \tag{3}$$

$$\Delta P = P_o - P \tag{4}$$

$$(\Delta p)_{normalised} = \Delta p \frac{(\Delta p_r)_{datum}}{\Delta p_r} \tag{5}$$

$$\Delta P = \Delta p \cdot \frac{\lambda}{1 + \lambda} \tag{6}$$

$$(\Delta P)_{normalised} = \Delta P \frac{(\Delta p_r)_{datum}}{\Delta p_r} \tag{7}$$

$$I = Ap(1 + \gamma M_N^2) \tag{8}$$

$$I_o = p(1 + \gamma M_N^2) \tag{9}$$

$$\frac{T}{t} = \left(\frac{P}{p}\right)^{\frac{\gamma-1}{\gamma}} \tag{10}$$

$$M_N^2 = \frac{2}{\gamma - 1}\left[\left(\frac{P}{p}\right)^{\frac{\gamma-1}{\gamma}} - 1\right] \tag{11}$$

$$I = \rho A V^2 + Ap \tag{12}$$

$$V^2 = \frac{2}{\rho}(P - p) \tag{13}$$

$$1 - \frac{I}{Ap_o} = \frac{2\Delta P}{p_o} - \frac{\Delta p}{p_o} \tag{14}$$

$$1 - \frac{I_i}{A_i p_o} = \frac{2\Delta P_i}{p_o} - \frac{\Delta p_i}{p_o} \tag{15}$$

-continued
LIST OF FORMULAE $$\Delta P_i = \Delta p_i \cdot \frac{\lambda_i}{1+\lambda_i} \quad (16)$$

$$1 - \frac{I_i}{A_i p_o} = \frac{\Delta p_i}{p_o}\left[\frac{2\lambda_i}{1+\lambda_i} - 1\right] \quad (17)$$

$$M_i = K_i\sqrt{\Delta p_i - \Delta P_i} \quad (18)$$

$$M_i = K_i\sqrt{\frac{\Delta p_i}{1+\lambda_i}} \quad (19)$$

$$M_e = K_e\sqrt{\Delta p_e - \Delta P_e} \quad (20)$$

$$\lambda_e = \frac{\Delta P_e}{\Delta p_i}(1+\lambda_i) - \lambda_i \quad (21)$$

$$M_e = K_e\left[\Delta p_e - \Delta p_i\frac{(\lambda_e + \lambda_i)}{1+\lambda_i}\right]^{\frac{1}{2}} \quad (22)$$

$$I_{e'} = A_i p_e + M_e V_e \quad (23)$$

$$I_{e'} = p_e[(1+\gamma M_{Ne}^2)A_i - \gamma M_{Ne}^2 \cdot A_j] \quad (24)$$

$$1 - \frac{I_{e'}}{A_i p_o} = 2A'\frac{\Delta P_e}{p_o} - \frac{\Delta p_e}{p_o}(2A'-1) \quad (25)$$

$$1 - \frac{I_{e'}}{A_i p_o} = 2A'\frac{\Delta p_i(\lambda_e + \lambda_i)}{p_o(1+\lambda_i)} - \frac{\Delta p_e}{p_o}(2A'-1) \quad (26)$$

$$1 - \frac{I_{e'}}{A_i p_o} = 2A'\frac{\Delta p_i(\lambda_e + \lambda_i)}{p_o(1+\lambda_i)} - \frac{M_e^2}{p_o K_e^2}(2A'-1) \quad (27)$$

$$D = I_i - I_{e'} \quad (28)$$

$$D = A_i\left[\Delta p_i\frac{(1+\lambda_e)}{(1+\lambda_i)} - (2A'-1)\frac{M_e^2}{K_e^2}\right] \quad (29)$$

$$D = A_i\left[\Delta p_e - \Delta p_i\frac{(\lambda_i - 1)}{(\lambda_i + 1)} - 2\frac{M_e^2}{K_e^2}(1-A')\right] \quad (30)$$

$$p_e - p_i = \Delta p_i\frac{(1-\lambda_e)}{1+\lambda_i} - \frac{M_e^2}{K_e^2} \quad (31)$$

$$p_i = f_1(X_B) \pm (O \to \bar{y}_1) \quad (32)$$
$$p_e = f_2(X_B) \pm (O \to \bar{y}_2) \quad (33)$$

I claim:

1. A method of correcting thrust measurements in an aeroengine test cell in respect of an aeroengine installed for testing therein, said aeroengine having an air-washed external surface with an upstream end and a downstream end with respect to airflow thereover, and said testing of said aeroengine involving the correction of net thrust measurements $X_B$ to gross thrust measurements X by means of a thrust correction D representing the drag due to air-flows into said aeroengine, over said air-washed external surface of said aeroengine, and through said test cell, where $X_B=X-D$, said test cell having;
air inlet means for allowing air to enter said test cell to supply said aeroengine,
exhaust means whereby efflux from said aeroengine plus air entrained into said efflux from within said test cell is exhausted from said test cell, and
thrust balance means for measuring said net thrust $X_B$ of said aeroengine in said test cell: said method comprising;
obtaining, during testing of said engine, a measure of static pressume $p_i$ at an "inlet" location i in said test cell, and a measure of static pressure $p_e$ at an "exit" location e in said test cell, said location i being downstream of said air inlet means and upstream of said aeroengine and said location e being spaced outwardly from, but in substantial registration with, said downstream end of said air-washed external surface of said aeroengine, and
calculating the value of D by utilising said measures of $p_i$ and $p_e$ in a function of the form $D=f(p_i, p_e)$ 2. A method according to claim 1, wherein $$D=A_i[\Delta p_i(1+\lambda_e)/(1+\lambda_i)-(2A'-1)M_e^2/K_e^2]$$

where
$A_i$=cross sectional area of airstream at inlet plane location of test cell
$\lambda_e$=local pressure loss coefficient at exit plane location of test cell
$\lambda_i$=local pressure loss coefficient at inlet plane location of test cell $$A' = \frac{A_i - \text{cross sectional area of propulsive/jets (bypass + core)}}{A_i}$$

$M_e$=Mass flow of airstream at exit plane location of test cell
$K_e$=incompressible airstream massflow constant at exit plane location of test cell
$\Delta p_i$=po−pi
po=ambient (atmospheric) pressure.

3. A method according to claim 1, wherein $$D=A_i[\Delta p_e-\Delta p_i(\lambda_i-1)/(\lambda_i+1)-2(1-A')M_e^2/K_e^2]$$

where
$A_i$=cross sectional area of airstream at inlet plane location of test cell
$\lambda_i$=local pressure loss coefficient at inlet plane location of test cell $$A' = \frac{A_i - \text{cross sectional area of propulsive/jets (bypass + core)}}{A_i}$$

$M_e$=Mass flow of airstream at exit plane location of test cell
$K_e$=incompressible airstream massflow constant at exit plane location of test cell
Δpi=po−pi
po=ambient (atmospheric) pressure)
Δpe=po−pe.

4. A method of monitoring airflow in an aeroengine test cell in respect of an aeroengine installed for testing therein, said aeroengine having an air-washed external surface with an upstream end and a downstream end with respect to airflow thereover, and said testing of said aeroengine involving the correction of net thrust measurements $X_B$ to gross thrust measurements X by means of a thrust correction D representing the drag due to air-flows into said aeroengine, over said air-washed external surface of said aeroengine, and through said test cell, where $X_B = X - D$, said test cell having;

air inlet means for allowing air to enter said test cell to supply said aeroengine, exhaust means whereby efflux from said aeroengine plus air entrained into said efflux from within said test cell is exhausted from said test cell, and thrust balance means for measuring said net thrust $X_B$ of said aeroengine in said test cell: the method comprising;

obtaining, during testing of said engine, a measure of the static pressure $p_i$ at an "inlet" location is in said test cell, and a measure of the static pressure $p_e$ at an "exit" location e in said test cell, location i being downstream of said air inlet means and upstream of said aeroengine and location e being spaced outwardly from, but in substantial registration with, said downstream end of said air-washed external surface of said aeroengine and monitoring variations of $p_i$ and $p_e$ with respect to $X_B$ and detecting such of said variations as are outside predetermined limits of variation of $p_i$ and $p_e$ with respect to $X_B$, such detection of variations outside said predetermined limits indicating the occurence of changes in the characteristics of airflow into and through the test cell sufficient to alter significantly the value of said thrust correction D.

5. A system for correcting thrust measurements in an aeroengine test cell in respect of an aeroengine installed for testing therein, said aeroengine having an air-washed external surface with an upstream end and a downstream end with respect to airflow thereover, and said testing of said aeroengine involving the correction of net thrust measurements $X_B$ to gross thrust measurements X by means of a thrust correction D representing the drag due to air-flows into said aeroengine, over said external surface of said aeroengine, and through said test cell, where $X_B = X - D$, said test cell having;

air inlet means for allowing air to enter said test cell to supply said aeroengine, exhaust means whereby efflux from said aeroengine plus air entrained into said efflux from within said test cell is exhausted from said test cell, and thrust balance means for measuring said net thrust $X_B$ of said aeroengine in said test cell: said system comprising;

first pressure measurement means for obtaining a measure of the static pressure $p_i$ at an "inlet" location i in said test cell situated downstream of said air inlet means and upstream of said aeroengine, second pressure measurement means for obtaining a measure of the static pressure $p_e$ at an "exit" location e in said test cell situated outwardly from but in substantial registration with the downstream end of said air-washed external surface of said aeroengine, and data processing means connected to said first and second pressure measurement means for receiving said measures of pressures $p_i$ and $p_e$, and calculating the value of D from a function of the form $D = f(p_i, p_e)$.

6. A system according to claim 5, wherein $$D = A_i[\Delta p_i(1+\lambda_e)/(1+\lambda_i) - (2A' - j)M_e^2/K_e^2]$$

where $A_i$ = cross sectional area of airstream at inlet plane location of test cell $\lambda_e$ = local pressure loss coefficient at exit plane location of test cell $\lambda_i$ = local pressure loss coefficient at inlet plane location of test cell $$A' = \frac{A_j - \text{cross sectional area of propulsive/jets (bypass + core)}}{A_i}$$

$M_e$ = Mass flow of airstream at exit plane location of test cell $K_e$ = incompressible airstream massflow constant at exit plane location of test cell $\Delta p_i = p_o - p_i$ $p_o$ = ambient (atmospheric) pressure.

7. A system according to claim 5, wherein $$D = A_i[\Delta p_e - \Delta p_i(\lambda_i - 1)/(\lambda_i + 1) - 2(1 - A')M_e^2/K_e^2]$$

where $A_i$ = cross sectional area of airstream at inlet plane location of test cell $\lambda_i$ = local pressure loss coefficient at inlet plane location of test cell $$A' = \frac{A_j - \text{cross sectional area of propulsive/jets (bypass + core)}}{A_i}$$

$M_e$ = Mass flow of airstream at exit plane location of test cell $K_e$ = incompressible airstream massflow constant at exit plane location of test cell $\Delta p_i = p_o - p_i$ $p_o$ = ambient (atmospheric) pressure $\Delta p_e = p_o - p_e$.

8. A system for monitoring airflow in an aeroengine test cell in respect of an aeroengine installed for testing therein, said aeroengine having an air-washed external surface with an upstream end and a downstream end with respect to airflow thereover and said testing of said aeroengine involving the correction of net thrust measurements $X_B$ to gross thrust measurements X by means of a thrust correction D representing the drag due to air-flows into said aeroengine, over said air-washed external surface of said aeroengine, and through said test cell, where $X_B = X - D$, said test cell having;

air inlet means for allowing air to enter said test cell to supply said aeroengine, exhaust means whereby efflux from said aeroengine plus air entrained into said efflux from within said test cell is exhausted from said test cell, and thrust balance means for measuring said net thrust $X_B$ of said aeroengine in said test cell: the system comprising;

first pressure measurement means for obtaining a measure of the static pressure $p_i$ at an "inlet" locaton i in said test cell situated downstream of said air inlet means and upstream of said aeroengine, second pressure measurement means for obtaining a measure of the static pressure $p_e$ at an "exit" location e in said test cell situated outwardly from but in substantial registration with said downstream end of said air-washed external surface of said aeroengine, data processing means connected to said first and second pressure measurement means for monitoring variations of said measures of pressures $p_i$ and $p_e$ with respect to $X_B$ and detecting such of said variations as are outside predetermined limits of variation of said measures of $p_i$ and $p_e$ with respect to $X_B$, such detection of variations outside said predetermined limits indicating the occurence of changes in the characteristics of airflow into and through said test cell sufficient to alter significantly the value of said thrust correction D, and means indicating that variation outside said predetermined limits has occured.

* * * * *